(12) United States Patent
Voelkel et al.

(10) Patent No.: US 9,623,863 B2
(45) Date of Patent: Apr. 18, 2017

(54) CONTROL DEVICE FOR OPERATING A ROAD-COUPLED HYBRID VEHICLE

(71) Applicant: Bayerische Motoren Werke Aktiengesellschaft, Munich (DE)

(72) Inventors: Bernd Voelkel, Erding (DE); Henning Gelshorn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 101 days.

(21) Appl. No.: 14/635,171

(22) Filed: Mar. 2, 2015

(65) Prior Publication Data
US 2015/0246668 A1 Sep. 3, 2015

(30) Foreign Application Priority Data

Feb. 28, 2014 (DE) .................. 10 2014 203 668
Feb. 28, 2014 (DE) .................. 20 2014 001 774 U

(51) Int. Cl.
*B60K 6/00* (2006.01)
*B60W 10/00* (2006.01)
(Continued)

(52) U.S. Cl.
CPC ............ *B60W 20/00* (2013.01); *B60K 6/448* (2013.01); *B60K 6/52* (2013.01); *B60K 23/08* (2013.01);
(Continued)

(58) Field of Classification Search
CPC ......... B60K 6/00; B60K 6/547; B60W 10/111
See application file for complete search history.

(56) References Cited

U.S. PATENT DOCUMENTS

2003/0155165 A1* 8/2003 Kelledes .................. B60K 1/00
                                                            180/244
2005/0178592 A1 8/2005 Yamamoto et al.
(Continued)

FOREIGN PATENT DOCUMENTS

DE 60 2005 005 096 T2 6/2008
DE 10 2011 078 498 A1 4/2012
(Continued)

OTHER PUBLICATIONS

German Search Report dated Nov. 19, 2014, with English translation (Eleven (11) pages).

(Continued)

*Primary Examiner* — Tisha Lewis
(74) *Attorney, Agent, or Firm* — Crowell & Moring LLP

(57) ABSTRACT

A control device is provided for operating a road-coupled hybrid vehicle having a first drive unit assigned to a first axle, a second drive unit assigned to a second axle, and a selector device which can be operated by the driver for manually changing between a purely electric operating mode and an automatic operating mode. At least one electronic control unit controls the drive units at least partially as a function of the operator control of the selector device. The first drive unit has an electric motor and a two-speed transmission which can be shifted automatically and interacts with the electric motor, and the second drive unit has an internal combustion engine and a further transmission which interacts with the internal combustion engine.

8 Claims, 3 Drawing Sheets

(51) Int. Cl.
*B60W 20/00* (2016.01)
*B60K 23/08* (2006.01)
*B60K 6/52* (2007.10)
*F16H 63/30* (2006.01)
*B60W 10/06* (2006.01)
*B60W 10/08* (2006.01)
*B60W 10/11* (2012.01)
*B60K 6/448* (2007.10)
*B60W 50/08* (2012.01)
*B60W 30/182* (2012.01)
*B60K 17/04* (2006.01)

(52) U.S. Cl.
CPC ............ *B60W 10/06* (2013.01); *B60W 10/08* (2013.01); *B60W 10/11* (2013.01); *B60W 30/182* (2013.01); *B60W 50/082* (2013.01); *F16H 63/304* (2013.01); *B60K 17/04* (2013.01); *B60W 2560/02* (2013.01); *Y02T 10/6243* (2013.01); *Y02T 10/6265* (2013.01); *Y02T 10/6286* (2013.01); *Y10S 903/93* (2013.01); *Y10T 477/23* (2015.01)

(56) References Cited

U.S. PATENT DOCUMENTS

| | | |
|---|---|---|
| 2012/0010041 A1 | 1/2012 | Soliman et al. |
| 2013/0296129 A1 | 11/2013 | Itakura et al. |
| 2013/0333517 A1* | 12/2013 | Osuka ..................... B60K 6/48 74/661 |
| 2014/0290421 A1 | 10/2014 | Baumer et al. |
| 2014/0343774 A1 | 11/2014 | Wimmer et al. |
| 2015/0158382 A1* | 6/2015 | Mordukhovich ....... F16H 3/663 475/318 |
| 2015/0192192 A1* | 7/2015 | Honda .................. B60K 6/365 475/10 |
| 2016/0025200 A1* | 1/2016 | Petersen ................. B60K 1/00 475/204 |

FOREIGN PATENT DOCUMENTS

| | | |
|---|---|---|
| DE | 10 2011 004 862 A1 | 8/2012 |
| DE | 10 2011 005 962 A1 | 9/2012 |
| DE | 10 2012 203 584 A1 | 9/2013 |
| DE | 10 2012 211 920 A1 | 1/2014 |
| DE | 10 2013 208 965 A1 | 11/2014 |
| EP | 2 316 683 A1 | 5/2011 |
| FR | 2 946 293 A1 | 12/2010 |

OTHER PUBLICATIONS

Billig, et al. "The Innovative BMW Powertrain in the All New BMW i8", $22^{nd}$ Aachen Colloquium Automobile and Engine Technology 2013, BMW Group, Munich, Germany, pp. 871-886, (Sixteen (16) pages).

* cited by examiner

CONTROL DEVICE FOR OPERATING A ROAD-COUPLED HYBRID VEHICLE

CROSS REFERENCE TO RELATED APPLICATIONS

This application claims priority under 35 U.S.C. §119 from German Patent Application Nos. 10 2014 203 668.2 and 20 2014 001 774.3, filed Feb. 28, 2014, the entire disclosures of which are herein expressly incorporated by reference.

BACKGROUND AND SUMMARY OF THE INVENTION

The invention relates to a control device for operating a road-coupled hybrid vehicle equipped with at least one electronic control unit, a first drive unit (for example, with an electric motor as the drive motor) which is assigned to a first axle (for example, the front axle), and a second drive unit (for example, with an internal combustion engine as the drive motor) which is assigned to a second axle (for example, the rear axle).

The first drive unit and the second drive unit are not coupled with respect to the drive via a vehicle-internal mechanical clutch or longitudinal lock but instead merely by means of the road via the wheels. Such road-coupled hybrid vehicles are also referred as to "axle-split" hybrid vehicles. In this context, an electric motor is preferably used as the primary motor and an internal combustion engine as the secondary motor.

Various methods for operating a road-coupled hybrid vehicle are described, For example, in German Patent applications 10 2012 211 920, 10 2013 208 965 or 10 2013 219 085.

Hybrid vehicles of this type can be operated, in particular, in a first operating mode (preferably, an e-mode for purely electric driving) in which the electric motor is operated alone as a primary motor in order to control the drive, and in a second operating mode (preferably, an a-mode for automatically controlled electric and/or internal combustion engine driving) in which the internal combustion engine can also be automatically connected and disconnected as a secondary motor for controlling the drive.

German Patent applications 10 2012 211 920 and 10 2013 208 965 are concerned with a method for connecting the secondary motor.

In German Patent application 10 2013 219 085, the emphasis is on driving-performance-optimizing and consumption-optimizing drive strategies for actuating the primary and secondary motors for drive-oriented driving. In contrast, in the case of driving-dynamics oriented driving, in particular when there is a demand for traction, the emphasis is on the drive torque distribution between the axles.

The object of the invention is to improve a hybrid vehicle of the type mentioned at the outset with respect to an optimum compromise between achieving a high electric starting acceleration with a high drive torque and achieving the highest possible maximum vehicle velocity.

This and other objects are achieved according to the invention by a control device for operating a road-coupled hybrid vehicle having a first drive unit which is assigned to a first axle and having a second drive unit which is assigned to a second axle. A selector device can be operated by the driver for manually changing between a purely electric operating mode and an automatic operating mode. At least one electronic control unit controls the drive units at least partially also as a function of the operator control of the selector device, wherein the first drive unit has an electric motor and a two-speed transmission which can be shifted automatically and interacts with the electric motor, and wherein the second drive unit has an internal combustion engine and an additional transmission which interacts with the internal combustion engine.

The invention is based on a specific electromechanically controllable two-speed transmission with synchronized gear-speed changing processes, which two-speed transmission is assigned to an electric motor as a drive motor. This first (electric) drive unit composed of an electric motor as the drive motor and the above-mentioned two-speed transmission acts on a first axle of a hybrid vehicle and does not have a vehicle-internal mechanical connection to a second (internal combustion engine) drive unit on the second axle of the hybrid vehicle.

The control device according to the invention for controlling the change of gear speed in the two-speed transmission takes into account different drive modes in a hybrid vehicle, in particular in the event of a change from an automatic hybrid mode (a-mode) into a purely electric operating mode (e-mode), and vice versa.

The invention also relates to a control device for the sequence control of the change of the gear speed in the two-speed transmission, which change of gear speed is initiated with a reduction in the torque of the electric motor; this is because the device according to the invention does not provide a clutch between the electric motor and the two-speed transmission.

The inventive reduction in torque of the electric motor is preferably compensated for in the case of a change of gear speed at the first axle by the second drive unit on the second axle by road coupling, insofar as the second drive unit is not switched off or cannot be connected quickly enough.

The invention is based on the following considerations.

Combining an internal combustion engine and an e-machine (=electric motor) permits various operating modes (for example, purely electric driving, purely internal combustion engine driving or combined electric and internal combustion engine driving). For example, in the a-mode the internal combustion engine and the e-machine preferably operate together to provide strong acceleration. As a rule, in the case of acceleration, the e-machine serves for briefly feeding in high torques, since the internal combustion engine has a relatively slow time behavior.

The invention will be explained by way of example on the basis of a "split-axle" hybrid vehicle concept in which the e-machine is located as a central drive on the front axle, and the internal combustion engine is located as a central drive on the rear axle. The two drive technologies can be operated independently of one another and can also be coupled functionally to one another with respect to a wheel-torque-related torque structure by way of at least one electronic control unit, which is assigned to both drive technologies.

With respect to the technical background, reference is additionally made to a lecture by the Applicant at the 22nd Aachener Kolloquium in October 2013, in which reference is already made to a number of the concept considerations regarding the new BMW i8 vehicle (planned series production in March 2014) which preceded the invention. Furthermore, with respect to the general wheel-torque-related torque structure within the scope of the coupled drive control by way of an engine control unit (DME) in a road-coupled hybrid vehicle, reference is made by the Applicant to the earlier German Patent applications DE 10 2011 004 862 and DE 10 2011 005 962.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
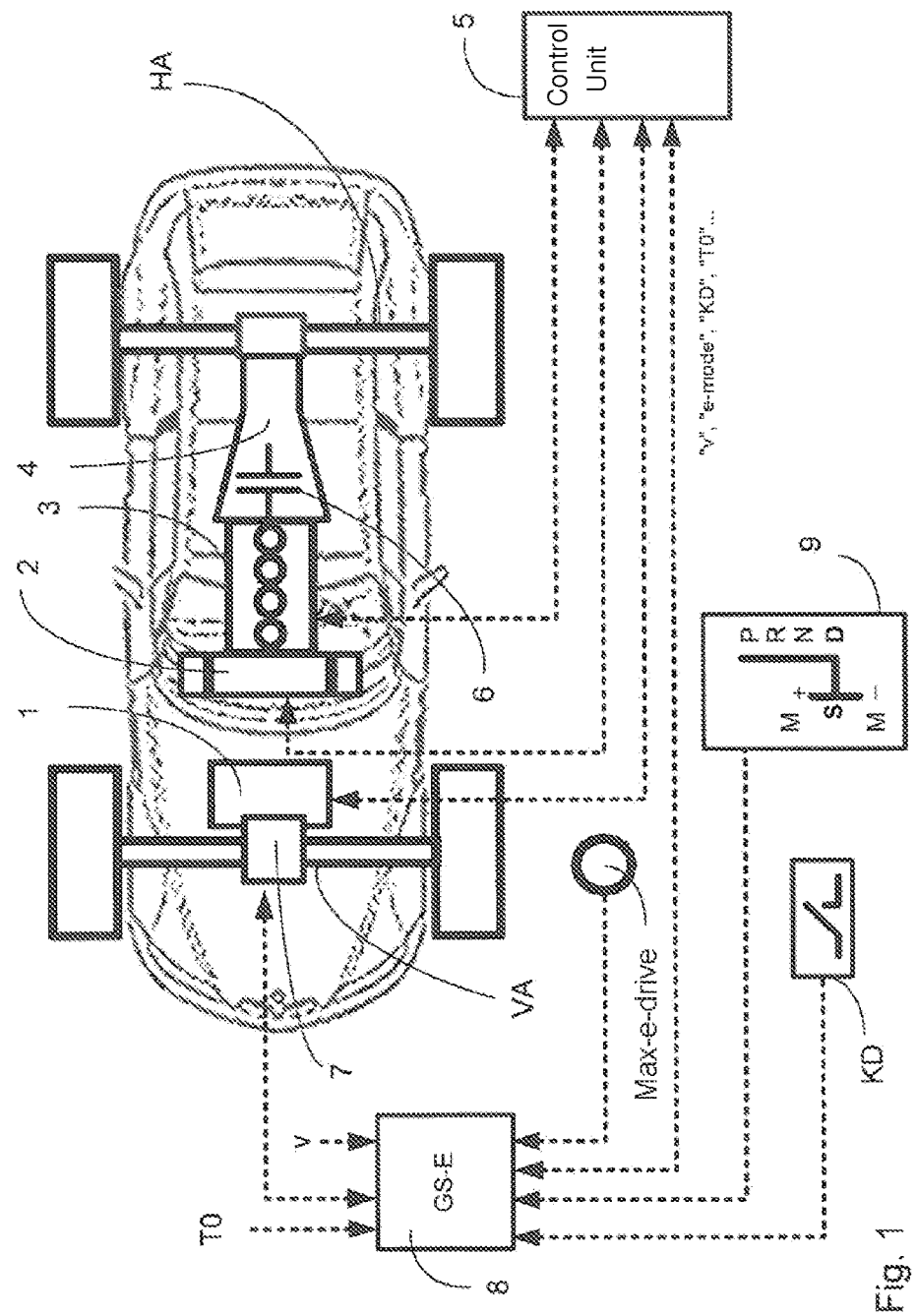
FIG. 1 is a schematic illustration of a road-coupled hybrid vehicle showing the components which are necessary for an understanding of an embodiment of the invention.

FIG. 1 illustrates what is referred to as a road-coupled hybrid vehicle having an electric motor 1, which acts as a first drive motor, for example, on the front axle VA, and having an internal combustion engine 3, which acts as a second drive motor, on the rear axle HA. A second electric motor 2 can be provided in addition to the internal combustion engine 3. Furthermore, a second transmission 4, preferably in the form of an electronically controllable automatic transmission (as is already known from the prior art of BMW series-production vehicles) is connected on its input side to the internal combustion engine 3. In an analogous fashion, the invention is also applicable to a differently arranged sequence of the components 2, 3 and 4.

The electric motor 1 could also be arranged on the rear axle, and the internal combustion engine 3 also on the front axle.

The electric motor 1 interacts with a two-speed transmission 7 without any intermediately connected clutch.

The hybrid vehicle also has a selector device ("max-e-drive" button), which can be operated by the driver, for manually changing between a purely electric operating mode (e-mode) and an automatic operating mode (a-mode).

Furthermore, in the hybrid vehicle there is an electronic transmission selector device 9, which is known per se (for example, from BMW series-production vehicles) and by which customary driving positions P, R, N and D which are provided for the automatic transmission 4, and a shift position "S" for selecting a sporty automatic mode, can be selected by the driver.

Finally in FIG. 1 a kick-down switch KD, which is also known, is illustrated. The kick-down switch KD is arranged as is known at the lower end of an accelerator pedal (not shown here in more detail).

The drive control of the hybrid vehicle is preferably carried out by way of a first electronic control unit 5, by which wheel-torque-related overall drive control can basically be carried out for all the drive motors which are present (known, for example, from German Patent applications DE 10 2011 004 862 and DE 10 2011 005 962 mentioned above). Furthermore, a function module GS-E ("transmission control e-drive") is, for example, also contained in the control unit 5 or preferably (as shown here) in an additional control unit 8 which is assigned mechatronically to the two-speed transmission 7 in a spatially closer fashion. The function module GS-E is configured, for example, as a software program module. The two-speed transmission 7 can preferably be actuated with the particularly advantageous sequence control (illustrated in FIG. 3) by means of the function module GS-E and the control units 5 and/or 8.

The control units 5 and 8 are preferably connected to one another via a data bus (for example CAN) and exchange sensor signals and control signals as required. For example, the control unit 8 can receive the vehicle velocity v and a signal TO as information from the control unit 5. The signal TO is generated if the fuel tank for the internal combustion engine 3 is empty.

Figure 2:
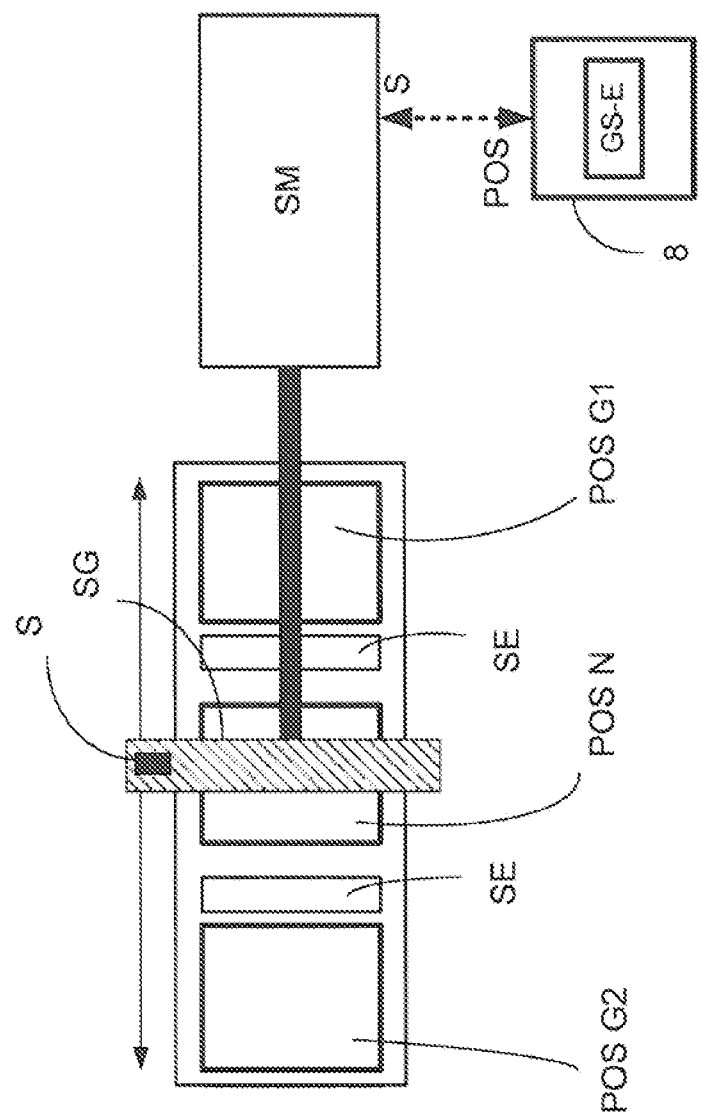
FIG. 2 is a schematic illustration of the actuator arrangement in the two-speed transmission for setting the shift lever positions by use of a shift fork which can be adjusted by electric motor.

FIG. 2 provides a functional explanation of the actuator arrangement of the two-speed transmission 7. A shift fork SG is movable in a translatory fashion by a spindle servomotor SM which can be actuated electrically by the control unit 8 into a first shift lever position POS G1, which is assigned to a first gear speed G1, into a middle shift lever position POS N, which is assigned to a neutral position N, and into a second shift lever position POS G2, which is assigned to a second gear speed G2. The instantaneous actual position of the shift fork SG can be detected by use of a Hall sensor S. Synchro-shift elements SE, which are known per se, are provided between the shift lever positions. The shift lever positions are actually shift lever position ranges which are predefined by a necessary play of a sliding block on the shift fork SG in order to reduce the frictional loss at the transition into the rotational movement of the adjustment rings (known per se).

The control unit 8 has a function module GS-E which is configured (in particular, programmed) in such a way that a change between the first gear speed G1 and the second gear speed G2 can be initiated as a function of the operator control of the selector device (max-e-drive button).

However, the function module GS-E is also configured (in particular, programmed) in such a way that a change between the first gear speed G1 and the second gear speed G2 can be initiated as a function of further predefined conditions.

Figure 3:
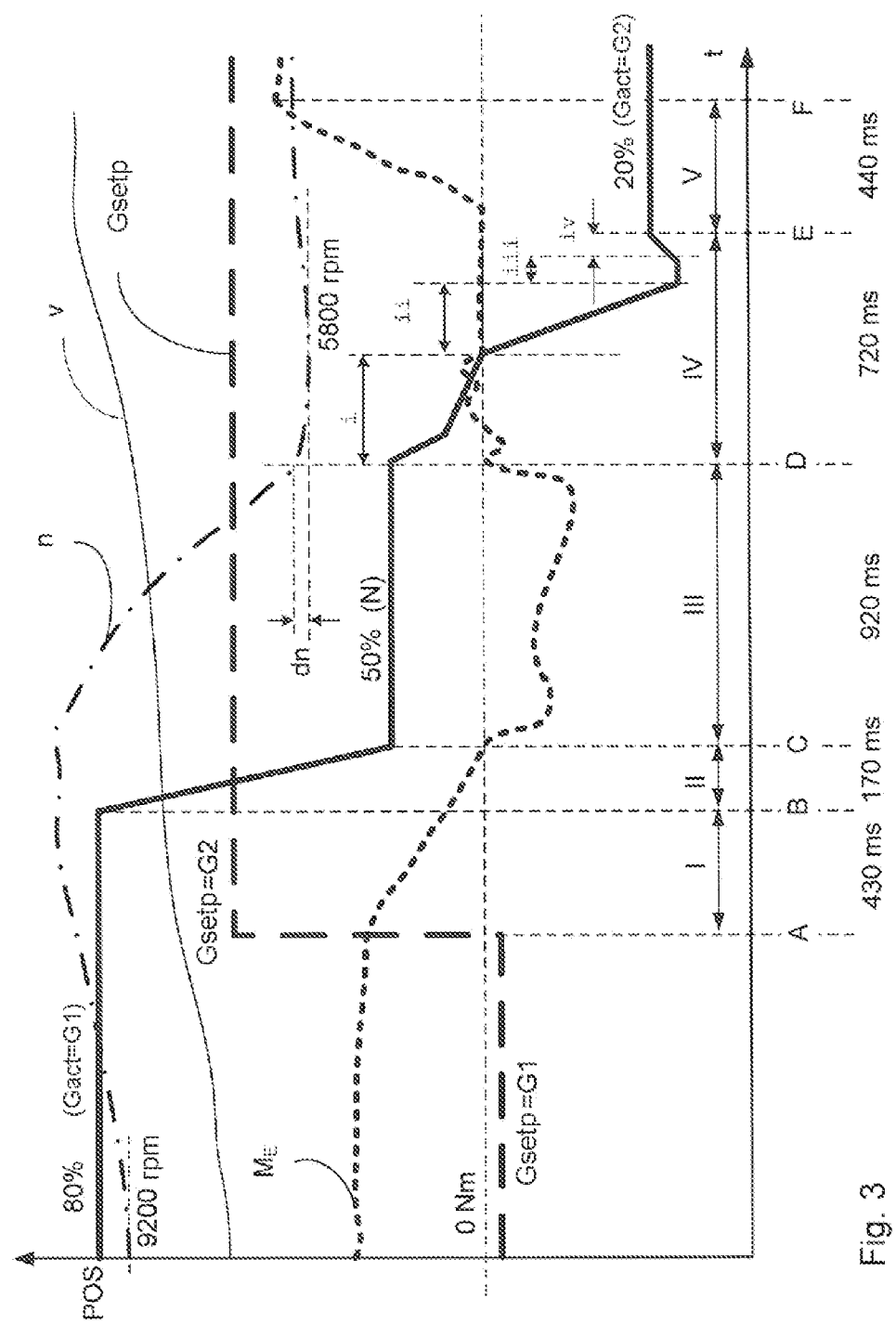
FIG. 3 is a graphical illustration of certain processes during advantageous shift sequence control by way of the shift device according to the embodiment of the invention.

A change of gear speed is initiated here, for example, with a set-point gear speed jump (for example, in the form of a digital up-shift or down-shift command within a software program, see FIG. 3 as well).

A change of gear speed preferably takes place (also as an independent concept) by way of the control device according to the following.

A change of gear speed from the second gear speed G2 into the first gear speed G1 is initiated when at least one of the predefined conditions is met:

1) When the selector device "max-e-drive" for switching on the e-mode is operated by the driver during forward travel and the vehicle velocity v is in a defined lower velocity range, for example 0<v<120 km/h.

NB: An upward end of the lower velocity range is generally determined by the maximum possible vehicle velocity v in the first gear speed G1 in the e-mode. Switching on the e-mode at a relatively high vehicle velocity v brings about a delay in the change of gear speed up to when the lower velocity range is reached.

OR

2) When forward travel occurs again after reverse travel during which the selector device (max-e-drive button) was operated by the driver to switch on the e-mode.

NB: During the reverse travel the 2nd gear speed is retained.

OR

3) When a signal (T0) is present which can be generated when there is an empty fuel tank.

NB: This change of gear speed is connected with an exception case where there is an automatic switching on of the e-mode without operating the selector device (max-e-drive button), since otherwise the vehicle could not continue driving (availability aspect, emergency running)

A change of gear speed from the first gear speed G1 into the second gear speed G2 is initiated when at least one of the predefined conditions is met:

1) when a kick-down switch KD is activated by the driver starting from the switched-on e-mode,
OR
2) when a sporty mode S is selected by the driver starting from the switched-on e-mode,
OR
3) when the hybrid vehicle is shut down or restarted,
OR
4) when the electric energy store for operating the electric motor 1 has reached a defined maximum permissible discharge.

An inventive aspect, which is also independent per se, is the sequence control of a change of gear speed according to FIG. 3, which is carried out in the following steps:

1) in a first step I, the torque ME of the electric motor 1 is reduced to at least virtually zero (since the two-speed transmission does not have a clutch which can be opened to interrupt the frictional engagement), 2) in a second step II, the frictional engagement between the electric motor 1 and the transmission 7 is canceled by setting the shift fork SG to the middle shift lever position POS N which is assigned to the neutral position N, 3) in a third step III, when the neutral position N is maintained by means of corresponding closed-loop or open-loop control of the torque ME of the electric motor 1, main synchronization of the rotational speed n of the electric motor 1 to the new gear speed (here G2) is performed at a given vehicle velocity v until a predefined, comparatively small, rotational speed difference dn is reached, and 4) in a fourth step IV, up to the engagement of the new gear speed (here G2), residual synchronization—see range (i)—is performed by overcoming the remaining rotational speed difference dn by means of the mechanically acting synchro-shift element SE.

In the fourth step IV after the range (i), in which the synchronization takes place, free flight preferably takes place in the range (ii). In the range (iii), the shift fork SG is positioned up to the mechanical stop of the shift lever position POS G2. Finally, in the range iv a friction-reducing free position of the sliding block described above takes place. In the range V, the torque ME of the electric motor 1, if appropriate together with the internal combustion engine 3, may be increased again in order to accelerate the vehicle further.

In this exemplary embodiment, a set-point gear speed jump from the first gear speed G1 into the second gear speed G2, that is to say at the upper limit of the defined lower velocity range e.g. in the case of a traction up-shift at 120 km/h, is assumed. In this context, the M-mode is therefore exited in order to reach a relatively high vehicle velocity with the participation of the second drive unit.

FIG. 3 illustrates the following course profiles:
1) long-dashed profile=set-point gear speed jump as an initiation command for an up-shift from the first gear speed G1 into the second gear speed G2 at the time A;
2) thin continuous profile=vehicle velocity v with a slight increase;
3) short dashed profile=torque ME of the electric motor 1 which is virtually zero at the time B and is zero at the time C;
4) bold continuous profile=position of the shift fork SG or adjustment travel in %, wherein at the time B when the torque ME is virtually zero, the shift lever position POS G1 is adjusted from the first gear speed G1 into the shift lever position N up to the time C;
5) dot-dash profile=rotational speed n of the electric motor 1, which provides approximately 9200 rpm before the change of gear speed here, and is intended to provide a synchronous rotational speed of approximately 5800 rpm after the change of gear speed; at the time D the synchronous rotational speed plus a predefined rotational speed difference do is reached; up to the time D the two-speed transmission remains in the neutral position N so that the torque ME can be adjusted to the rotational speed control without jolts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for operating a road-coupled hybrid vehicle having a first drive unit assigned to a first axle, a second drive unit assigned to a second axle, and a selector device operable by a driver for manually changing between an electric operating mode and an automatic operating mode, comprising:
   at least one electronic control unit configured to control the first and second drive units at least partially as a function of the driver control of the selector device, wherein
   the first drive unit has an electric motor and a two-speed transmission which is shiftable automatically and interacts with the electric motor, and
   the second drive unit has an internal combustion engine and a further transmission which interacts with the internal combustion engine,
   wherein
      the at least one control unit is programmed with at least three predefined condition criteria,
      a change of gear speed from the second gear speed into the first gear speed is initiated when at least one of the at least three predefined condition criteria is met, and
      the at least three predefined condition criteria include
         a) when the selector device for switching on the electric operating mode was operated by a driver during forward travel and the vehicle velocity is in a defined lower velocity range,
         b) when the selector device for switching on the electric operating mode was operated by the driver after reverse travel, and forward travel takes place again, or
         c) when a fuel tank empty signal is present.

2. The control device according to claim 1, wherein
   the two-speed transmission has a shift fork, which is movable in a translatory manner, by a servomotor actuated electrically by the at least one control unit, into a first shift lever position assigned to a first gear speed, into a middle shift lever position assigned to a neutral position, and into a second shift lever position assigned to a second gear speed.

3. The control device according to claim 1, wherein the at least one control unit is programmed such that a change of gear speed from the first gear speed into the second gear speed is initiated when at least one of the following predefined conditions is met:
  a) when a kick-down switch is activated by the driver starting from a switched-on electric operating mode,
  b) when a sporty mode is selected by the driver starting from the switched-on electric operating mode,
  c) when the hybrid vehicle is shut down or restarted, or
  d) when an electric energy store for operating the electric motor has reached a defined maximum permissible discharge.

4. The control device according to claim 2, wherein the at least one control unit is programmed to control a gear speed-change sequence in which:
  a) a torque of the electric motor is reduced to at least virtually zero,
  b) the shift fork is set to the middle shift lever position which is assigned to the neutral position,
  c) when in the neutral position a main synchronization of a rotational speed of the electric motor with the new gear speed is performed under corresponding closed-loop or open-loop control of the torque of the electric motor at a given vehicle velocity until a predefined rotational speed difference is reached, and
  d) prior to the engagement of the new gear speed, a residual synchronization is performed by a mechanically acting synchro-shift element to overcome a remaining rotational speed difference between the predetermined rotational speed difference and the new gear speed.

5. A road-coupled hybrid vehicle, comprising:
  a first drive unit assigned to a first axle, the first drive unit comprising an electric motor and a two-speed transmission, the two-speed transmission being shifted automatically and interacting with the electric motor;
  a second drive unit assigned to a second axle, the second drive unit comprising an internal combustion engine and a further transmission, the further transmission interacting with the internal combustion engine;
  a selector device operatively configured so as to be operable by a driver to manually change between an electric operating mode and an automatically operating mode of the road-coupled hybrid vehicle; and
  at least one electric control unit operatively configured to control the first and second drive units at least partially as a function of the selector device,
  wherein
    the at least one control unit is programmed with at least three predefined condition criteria,
    a change of gear speed from the second gear speed into the first gear speed is initiated when at least one of the at least three predefined condition criteria is met, and
    the at least three predefined condition criteria include
      a) when the selector device for switching on the electric operating mode was operated by a driver during forward travel and the vehicle velocity is in a defined lower velocity range,
      b) when the selector device for switching on the electric operating mode was operated by the driver after reverse travel, and forward travel takes place again, or
      c) when a fuel tank empty signal is present.

6. The road-coupled hybrid vehicle according to claim 5, wherein the two-speed transmission of the first drive unit comprises:
  a servomotor controllable via the at least one control unit; and
  a shift-fork displaceable via the servomotor into a first shift lever position assigned to a first gear speed, into a middle shift lever position assigned to a neutral position, and into a second shift lever position assigned to a second gear speed.

7. The road-coupled hybrid vehicle according to claim 5, wherein the at least one control unit further executes a program to:
  initiate a change of gear speed from the first gear speed into the second gear speed when at least one of the following predefined conditions is met:
  a) when a kick-down switch is activated by the driver starting from a switched-on electric operating mode,
  b) when a sporty mode is selected by the driver starting from the switched-on electric operating mode,
  c) when the hybrid vehicle is shut down or restarted, or
  d) when an electric energy store for operating the electric motor has reached a defined maximum permissible discharge.

8. The road-coupled hybrid vehicle according to claim 7, wherein the at least one first control unit is programmed to control a gear speed-change sequence in which
  a) a torque of the electric motor is reduced to at least virtually zero,
  b) the shift fork is set to the middle shift lever position which is assigned to the neutral position,
  c) when in the neutral position a main synchronization of a rotational speed of the electric motor with the new gear speed is performed under corresponding closed-loop or open-loop control of the torque of the electric motor at a given vehicle velocity until a predefined rotational speed difference is reached, and
  d) prior to the engagement of the new gear speed, a residual synchronization is performed by a mechanically acting synchro-shift element to overcome a remaining rotational speed difference between the predetermined rotational speed difference and the new gear speed.

* * * * *